(12) United States Patent
Finn et al.

(10) Patent No.: US 11,666,844 B2
(45) Date of Patent: Jun. 6, 2023

(54) FILTRATION DEVICE HAVING A LATCH MECHANISM ADAPTER

(71) Applicant: Caterpillar Inc., Peoria, IL (US)

(72) Inventors: Timothy Sean Finn, Morton, IL (US); Shawn M. Ryon, Metamora, IL (US); David J. Colantoni, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 17/039,372

(22) Filed: Sep. 30, 2020

(65) Prior Publication Data

US 2022/0096986 A1    Mar. 31, 2022

(51) Int. Cl.
| | | |
|---|---|---|
| B01D 46/00 | (2022.01) | |
| B01D 46/58 | (2022.01) | |
| B01D 46/42 | (2006.01) | |
| B01D 46/52 | (2006.01) | |
| F02M 35/02 | (2006.01) | |
| F02M 35/024 | (2006.01) | |

(52) U.S. Cl.
CPC ..... *B01D 46/0005* (2013.01); *B01D 46/4227* (2013.01); *B01D 46/525* (2013.01); *B01D 46/58* (2022.01); *B01D 2265/021* (2013.01); *B01D 2265/025* (2013.01); *B01D 2265/028* (2013.01); *B01D 2267/30* (2013.01); *B01D 2279/60* (2013.01); *F02M 35/0203* (2013.01); *F02M 35/024* (2013.01)

(58) Field of Classification Search
CPC ...... B01D 46/525–527; B01D 46/0005; B01D 2265/021; B01D 2265/025; B01D 2265/028; B01D 46/4227; B01D 46/58; B01D 2279/60; B01D 2267/30; F02M 35/0203
See application file for complete search history.

(56) References Cited

U.S. PATENT DOCUMENTS

| | | | |
|---|---|---|---|
| 7,008,467 | B2 | 3/2006 | Donaldson |
| 7,329,326 | B2 | 2/2008 | Donaldson |
| 7,674,308 | B2 | 3/2010 | Donaldson |
| D635,233 | S | 3/2011 | Donaldson |
| 7,959,702 | B2 | 6/2011 | Donaldson |

(Continued)

FOREIGN PATENT DOCUMENTS

| | | |
|---|---|---|
| CN | 105396391 A | 3/2016 |
| WO | 2004007054 A1 | 1/2004 |

(Continued)

*Primary Examiner* — Robert Clemente
(74) *Attorney, Agent, or Firm* — Harrity & Harrity LLP

(57) ABSTRACT

A filtration device may include an adapter, a filter element, and a housing. The adapter may include a collar having an upper rim and a lower rim, a plurality of locking tabs extending from the upper rim, and a plurality of snap members extending from the lower rim. The filter element may include a casing and a plurality of receptacles connected to and arranged around a first outer surface of the casing. The plurality of receptacles are configured to receive the plurality of locking tabs. The housing, which is configured to receive the filter element, includes a shell and a plurality of ramp members that are connected to a second outer surface of the shell. The plurality of ramp members are configure to engage the plurality of snap members.

20 Claims, 8 Drawing Sheets

(56) References Cited

U.S. PATENT DOCUMENTS

| | | |
|---|---|---|
| 8,216,334 B2 | 7/2012 | Donaldson |
| 8,246,707 B2 | 8/2012 | Donaldson |
| 8,545,589 B2 | 10/2013 | Donaldson |
| 8,709,116 B2 | 4/2014 | Muenkel |
| 9,242,199 B2 | 1/2016 | Donaldson |
| 9,320,997 B2 | 4/2016 | Donaldson |
| 9,492,775 B2 | 11/2016 | Donaldson |
| 9,808,752 B2 | 11/2017 | Donaldson |
| 10,532,310 B2 | 1/2020 | Donaldson |
| 2006/0081528 A1 | 4/2006 | Oelpke et al. |
| 2009/0241489 A1* | 10/2009 | Becker ............... B01D 45/06 55/320 |
| 2013/0000267 A1* | 1/2013 | Merritt ............ B01D 46/527 156/242 |
| 2014/0130468 A1* | 5/2014 | Jackson ............. B01D 46/58 55/482 |
| 2016/0305375 A1 | 10/2016 | Finn |
| 2017/0266601 A1 | 9/2017 | Carter et al. |
| 2018/0104633 A1* | 4/2018 | Bonne ................ F01M 13/04 |
| 2019/0046915 A1 | 2/2019 | Gieseke et al. |
| 2022/0099054 A1* | 3/2022 | Finn ............... B01D 46/0005 |

FOREIGN PATENT DOCUMENTS

| | | |
|---|---|---|
| WO | 2014210541 A1 | 12/2014 |
| WO | 2015039993 | 3/2015 |

\* cited by examiner

FILTRATION DEVICE HAVING A LATCH MECHANISM ADAPTER

TECHNICAL FIELD

The present disclosure relates generally to a filtration device and, for example, to a filter element and a housing of the filtration device.

BACKGROUND

In order for an engine to convert chemical energy stored in fuel into mechanical work, the engine utilizes air from the surrounding environment to cause the fuel to combust. However, because the air in the surrounding environment is often laden with debris particles (e.g., dust, sand, or other particles), which may damage components of the engine and/or obstruct the fuel, the air may need to be filtered prior to entering the engine. As a result, some engine-driven machines (e.g., vehicles, generators, or other types of machines) may include an air cleaner assembly having one or more filtration devices that selectively capture the debris particles while permitting clean air to pass therethrough.

As filter media within the one or more filtration devices becomes filled with the debris particles, the pressure differential across the one or more filtration devices tends to increase, which may in turn decrease the efficiency of the engine. Thus, the filter media may need to be periodically removed from the air cleaner assembly for replacement and/or cleaning. To allow removal of the filter media, the one or more filtration devices may include latch mechanisms which removably secure the filter media therein. However, due to space constraints in the machine, inclusion of the latch mechanisms may limit a size and/or quantity of the filtration devices within the air cleaner assembly, may complicate replacement of the filter media, and/or have other drawbacks.

U.S. Pat. No. 8,245,868, which issued to Ikeda et al. on Aug. 21, 2012, discloses a case locking mechanism located between a first case part and a second case part. The mechanism comprises a projection, a deformable piece, a hook portion, a guide portion, and a holding portion. The projection is formed on an outer side surface of the first case part. The deformable piece is integrally formed with an outer side surface of the second case part and has a folded back curved portion at a midpoint in a longitudinal direction. The hook portion is formed at a distal portion of the deformable piece and is engageable with the projection. The guide portion is formed on the projection. When the case parts are closed, the guide portion guides a claw portion formed in the hook portion in such a direction that the claw portion engages with the projection. The holding projection is formed on the projection to maintain the engaged state between the claw portion and the projection.

The filtration device of the present disclosure solves one or more of the problems set forth above and/or other problems in the art.

SUMMARY

In some implementations, an adapter comprises a collar, a plurality of locking tabs, and a plurality of snap members. The collar has an upper rim, a lower rim, and a wall connecting the upper rim to the lower rim. The upper rim extends radially inward from the wall, and the lower rim extends radially outward from the wall. The plurality of locking tabs extend downwardly from the upper rim and are configured to resiliently engage a plurality of receptacles of a filter element to connect the adapter with the filter element. The plurality of snap members extend radially outward from the lower rim and are configured to resiliently engage one or more ramp members of a housing to connect the filter element with the housing.

In some implementations, a filter element comprises a casing, a flange, and a plurality of receptacles. The casing has a first end, a second end, and an outer surface that connects the first end to the second end. The outer surface defines a perimeter of the casing. The flange is connected to the outer surface and extends around the perimeter of the casing. The flange has an upper surface. The plurality of receptacles are connected to the outer surface and arranged around the perimeter of the casing. The plurality of receptacles are configured to receive a plurality of locking tabs of an adapter to permit the filter element to be connected to a housing. The plurality of receptacles extend between the first end of the casing and the upper surface of the flange.

In some implementations, a filtration device comprises an adapter, a filter element, and a housing. The adapter includes a collar, a plurality of locking tabs, and a plurality of snap members. The collar has an upper rim and a lower rim. The plurality of locking tabs extend downwardly from the upper rim. The plurality of snap members extend radially outward from the lower rim. The filter element is configured to receive the adapter and includes a casing and a plurality of receptacles. The casing has a first outer surface that defines a first perimeter of the casing. The plurality of receptacles are connected to the first outer surface and arranged around the first perimeter of the casing. The plurality of receptacles are configured to receive the plurality of locking tabs of the adapter. The housing is configured to receive the filter element and includes a shell and a plurality of ramp members. The shell has a second outer surface. The plurality of ramp members are fixedly connected to the second outer surface and are configured to engage the plurality of snap members of the adapter.

DETAILED DESCRIPTION

This disclosure relates to a filtration device having a latch mechanism. The filtration device has universal applicability to any device and/or system involved in filtering air. For example, the filtration device may be part of an air cleaner assembly that fluidly communicates with a power system, a fuel system, and/or the like. The device and/or system may be implemented in a machine associated with an industry, such as mining, construction, farming, transportation, or another type of industry.

To simplify the explanation below, the same reference numbers may be used to denote like features. The drawings may not be to scale.

Figure 1:
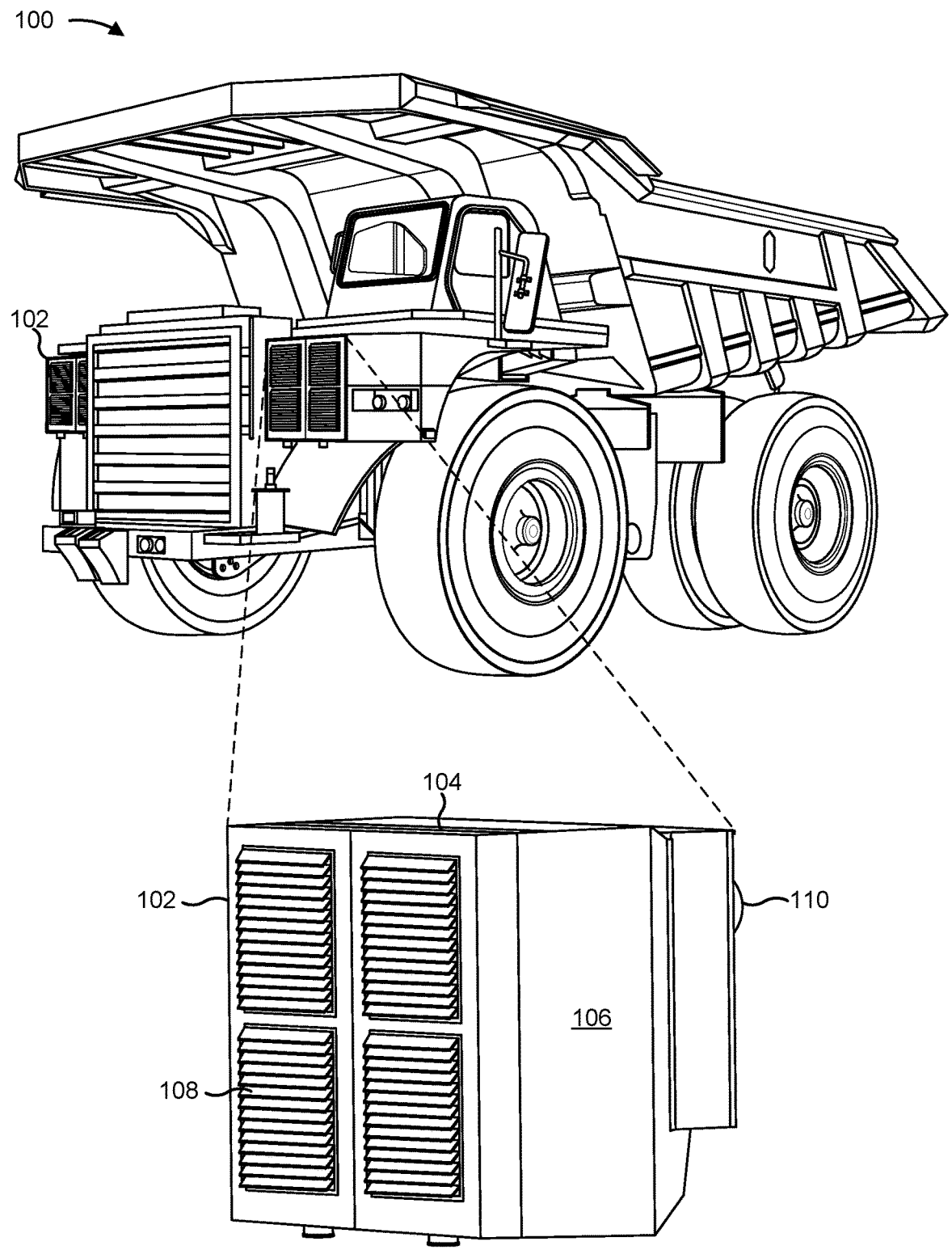
FIG. 1 is a diagram of an example machine that includes an air cleaning assembly.

FIG. 1 is a diagram of an example machine 100 that includes an air cleaner assembly 102. The machine 100 is powered by an engine that utilizes an air intake system to convert chemical energy stored in fuel into mechanical work. For example, the machine 100 may be a ground-borne vehicle, such as a mining truck (shown in FIG. 1), a tractor, a backhoe loader, a dozer, an excavator, a grader, or another type of vehicle. As another example, the machine 100 may be a stationary machine, such as a generator, a pump, or another type of machine.

The air cleaner assembly 102 is a device that is configured to filter air from an environment to prevent debris particles within the air (e.g., dust, sand, or other types of particles) from entering the air intake system associated with the engine. For example, as shown in FIG. 1, the air cleaner assembly 102 may include a pre-cleaner 104, which provides a first stage of air filtration, and a cabinet 106, which provides a second stage of air filtration. In use, the air cleaner assembly 102 is mounted to the machine 100 to fluidly communicate with the air intake system associated with the engine. For example, as will be described below in connection with FIGS. 2-3, the air may enter the air intake system of the machine 100 by flowing into a plurality of inlet ports 108 of the pre-cleaner 104 and out of a plurality of outlet ports 110 of the cabinet 106.

As indicated above, FIG. 1 is provided as an example. Other examples may differ from what is described with regard to FIG. 1. For example, the number and arrangement of air cleaner assemblies 102 may differ from that shown in FIG. 1. Thus, there may be additional air cleaner assemblies, fewer air cleaner assemblies, different air cleaner assemblies, and/or differently arranged air cleaner assemblies than those shown in FIG. 1.

Figure 2:
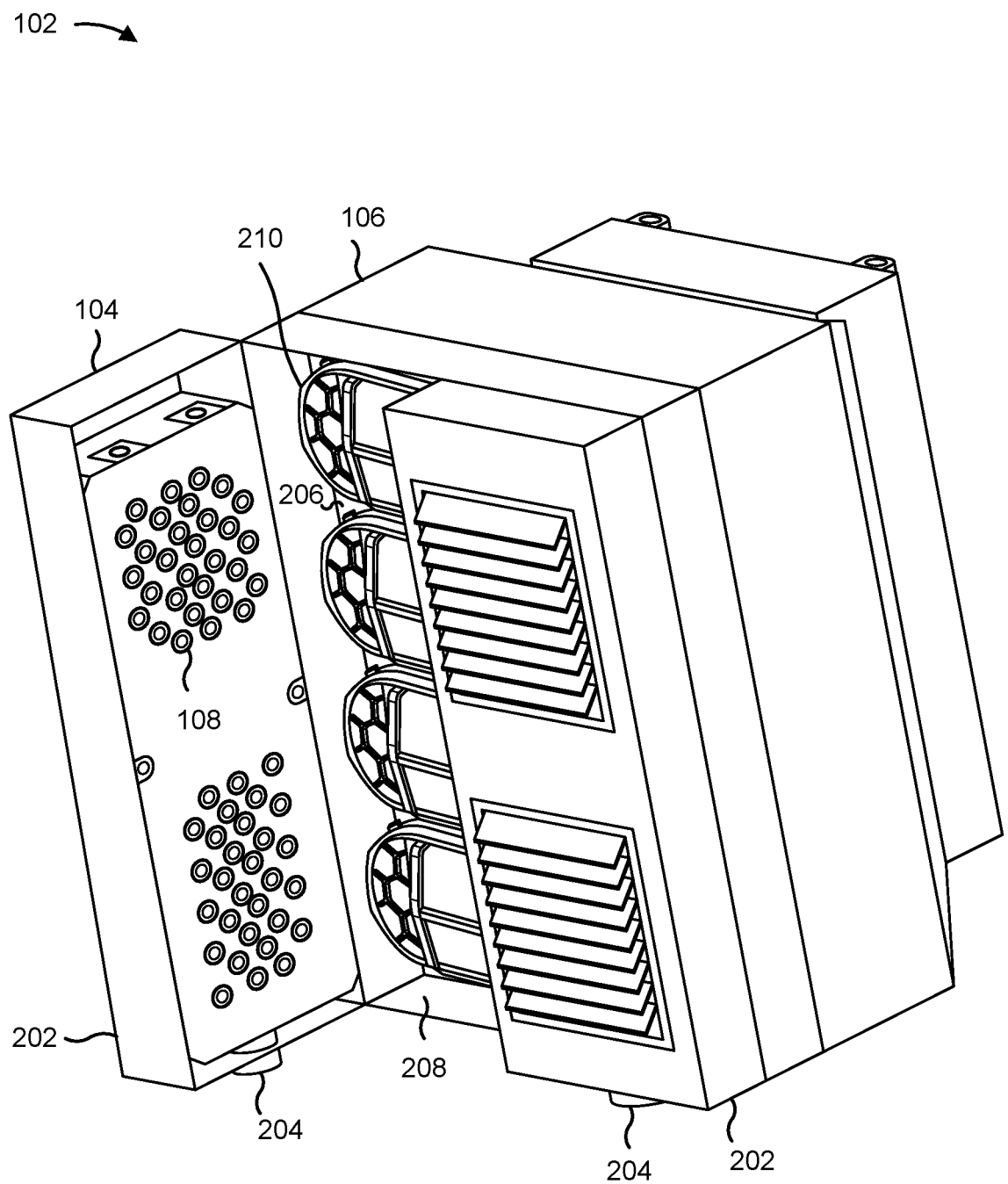
FIGS. 2-3 are diagrams of the air cleaning assembly of FIG. 1, which has a plurality of filtration devices therein.
Figure 3:
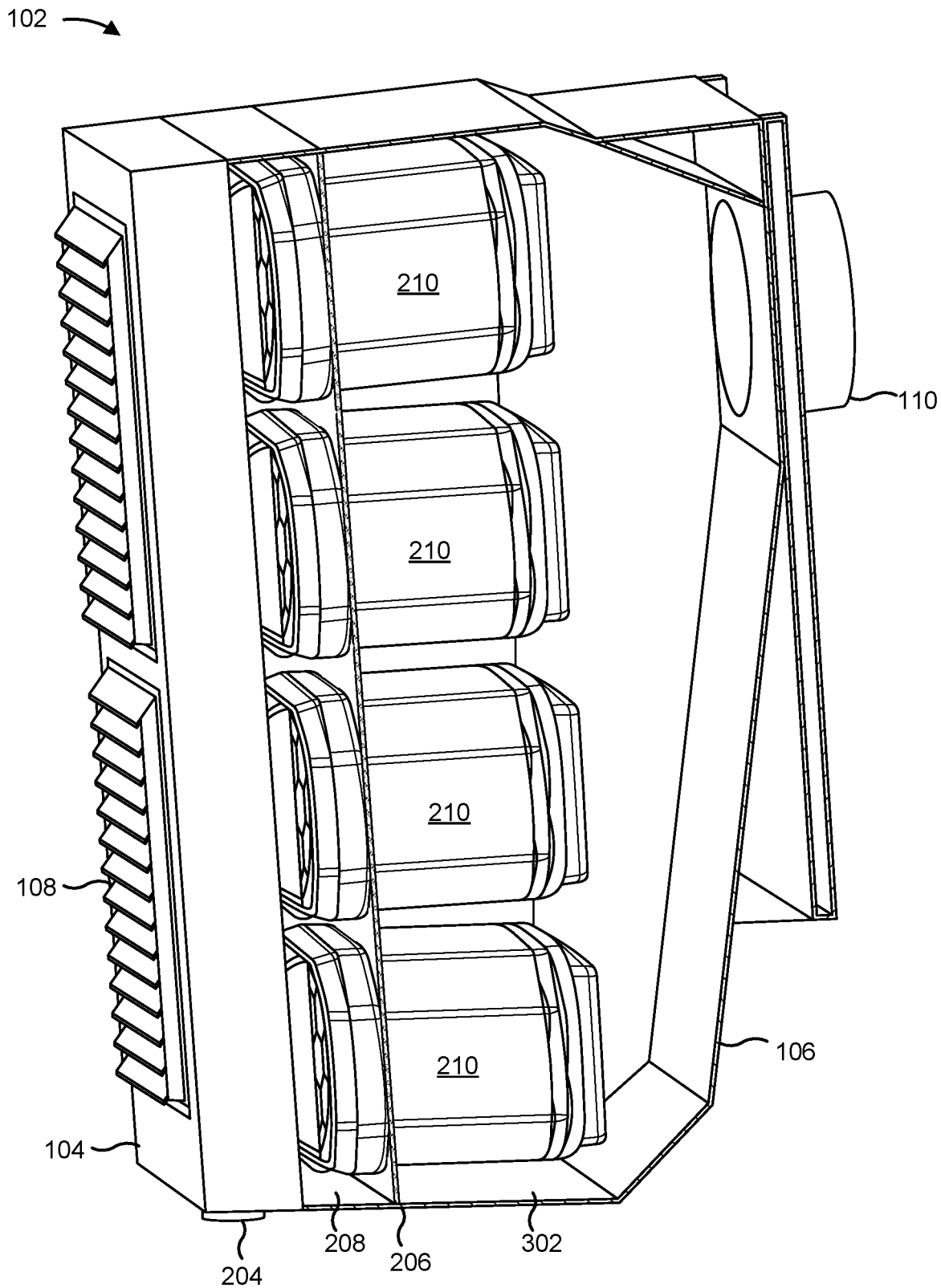

FIGS. 2-3 are diagrams of the air cleaner assembly 102. FIG. 2 is an isometric view of the air cleaner assembly 102. FIG. 3 is a cross-sectional view of the air cleaner assembly 102.

As shown in FIGS. 2-3, the pre-cleaner 104 includes a pair of doors 202 that are hingedly attached to the cabinet 106 to move between a closed position and an open position. Each door 202 includes a subset of the plurality of inlet ports 108, which are configured to cause the air passing therethrough to spin. As the air travels along the plurality of inlet ports 108 to enter the cabinet 106, the air may eject a majority of the debris particles within the air into a pair of collection pipes 204 for collection and/or removal. In such a way, the pre-cleaner 104 may provide the first stage of air filtration.

The cabinet 106 includes a platform 206 mounted therein to divide an interior of the cabinet 106 into a front interior space 208 and a rear interior space 302 (shown in FIG. 3). The front interior space 208 is configured to be covered by the pre-cleaner 104 to receive the air passing therethrough, and the rear interior space 302 is configured to fluidly communicate with the plurality of outlet ports 110 to allow the air to exit the air cleaner assembly 102. To selectively filter a remaining amount of the debris particles within the air while permitting the air to travel from the front interior space 208 to the rear interior space 302, the platform 206 includes a plurality of filtration devices 210, alternatives of which will be described below in connection with FIGS. 5-8. In such a way, the cabinet 106 may provide the second stage of air filtration.

As indicated above, FIGS. 2-3 are provided as an example. Other examples may differ from what is described with regard to FIGS. 2-3. For example, the number and arrangement of components (e.g., the plurality of inlet ports 108, the plurality of outlet ports 110, the pair of doors 202, the pair of collection pipes 204, and/or the plurality of filtration devices 210) may differ from that shown in FIGS. 2-3. Thus, there may be additional components, fewer components, different components, and/or differently arranged components than those shown in FIGS. 2-3.

Figure 4:
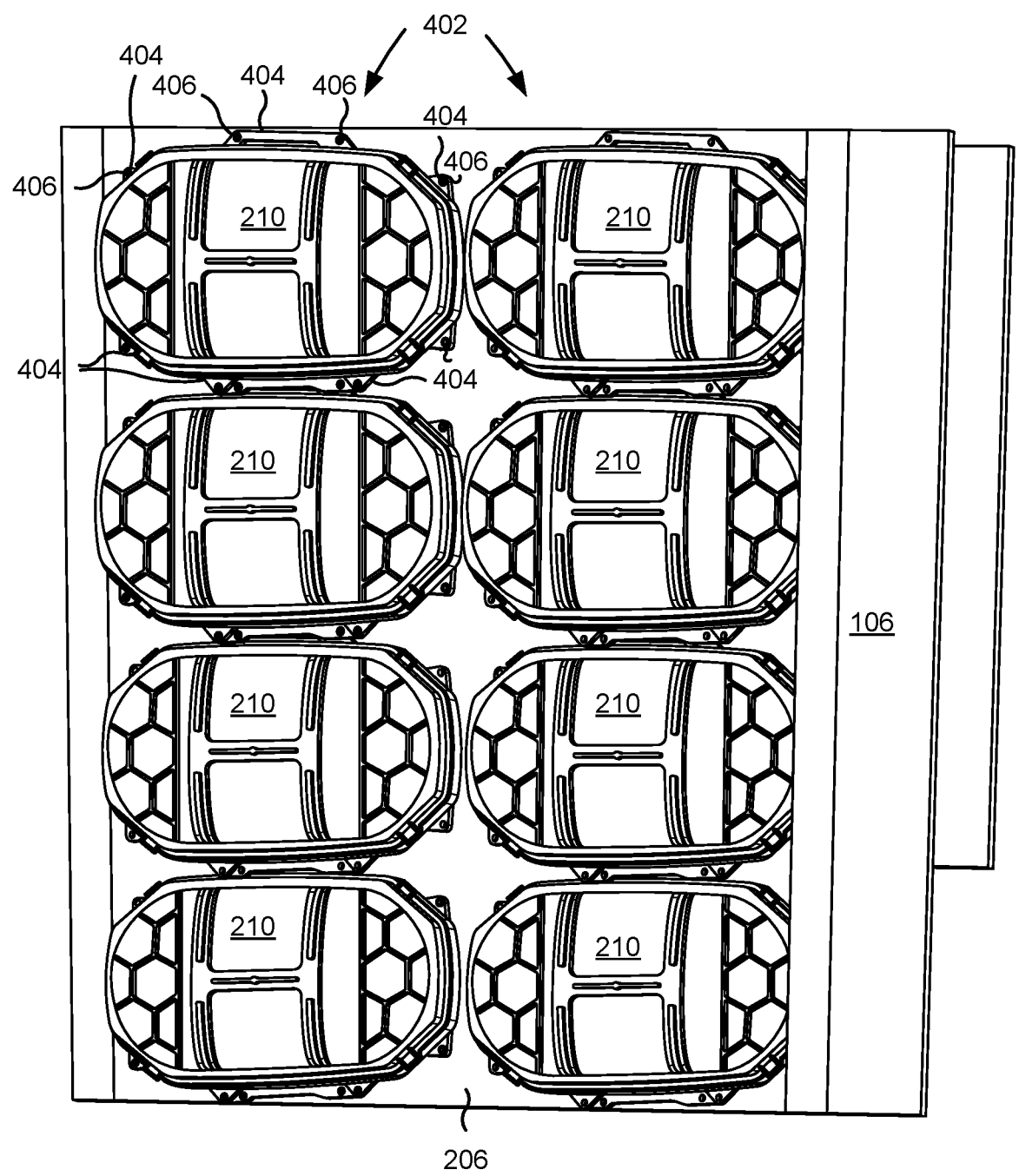
FIG. 4 is a diagram of the plurality of filtration devices of FIGS. 2-3.

FIG. 4 is a front view of the plurality of filtration devices 210 secured within the cabinet 106. As shown in FIG. 4, the plurality of filtration devices 210 are compactly arranged within the cabinet 106 to maximize filtration capability for a given size of the cabinet 106. The plurality of filtration devices 210 are substantially identical and interchangeable. Each filtration device 210 includes a mounting mechanism 402 that secures the respective filtration device 210 to the platform 206. Each mounting mechanism 402 includes a plurality of mounting tabs 404, which extend radially and fixedly from the respective filtration device 210, and a plurality of fasteners 406 (e.g., screws, bolts, and/or another type of fastener), which are configured to extend through the plurality of mounting tabs 404 and into the platform 206. To minimize spacing between the plurality of filtration devices 210, the plurality of mounting tabs 404 may be spaced apart and offset from one another. Thus, when the plurality of filtration devices 210 are secured to the platform 206, as shown in FIG. 4, a mounting tab 404 of one filtration device 210 may be received in a space between two mounting tabs 404 of an adjacent filtration device 210.

To adequately filter the air entering the intake system of the machine 100, each of the plurality of filtration devices 210 may have a length in a range of approximately 18 inches to approximately 22 inches, a width in a range of approximately 10 inches to approximately 14 inches, and a depth in a range of approximately 8 inches to approximately 12 inches. For example, the length may be approximately 20 inches, the width may be approximately 12 inches, and the depth may be approximately 10 inches. Furthermore, in order to minimize spacing between the plurality of filtration devices 210, each of the plurality of mounting tabs 404 may have a radial length in a range of approximately 0.5 inches to approximately 1.5 inches. For example, the radial length may be approximately 0.9 inches. Other dimensions are possible.

As indicated above, FIG. 4 is provided as an example. Other examples may differ from what is described with regard to FIG. 4. For example, the number and arrangement of components (e.g., the plurality of filtration devices 210, the plurality of mounting tabs 404, and/or the plurality of fasteners 406) may differ from that shown in FIG. 4. Thus, there may be additional components, fewer components, different components, differently shaped components, and/or differently arranged components than those shown in FIG. 4.

Figure 5:
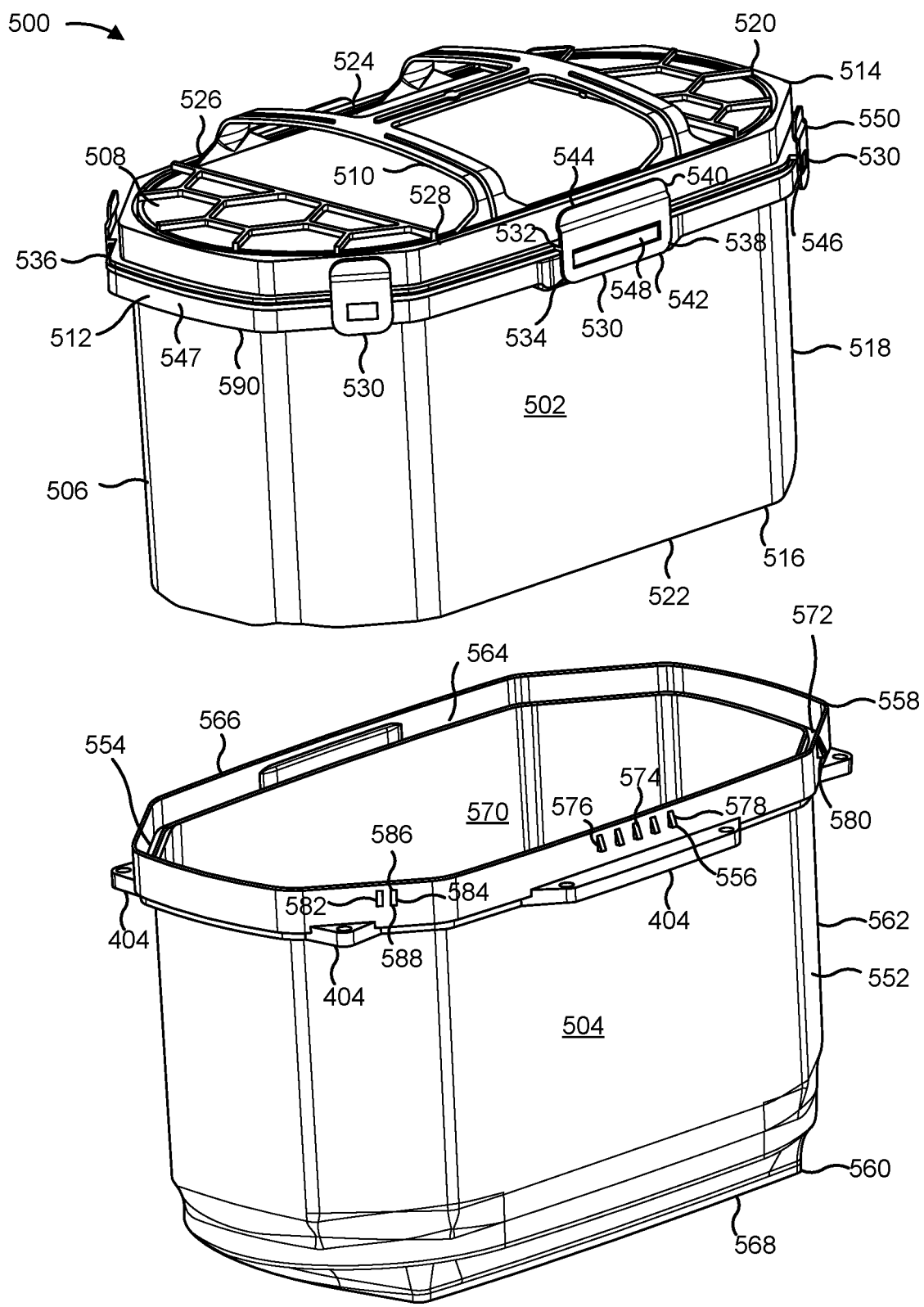
FIGS. 5-6 are diagrams of a filtration device, according to one or more aspects of the present disclosure.
Figure 6:
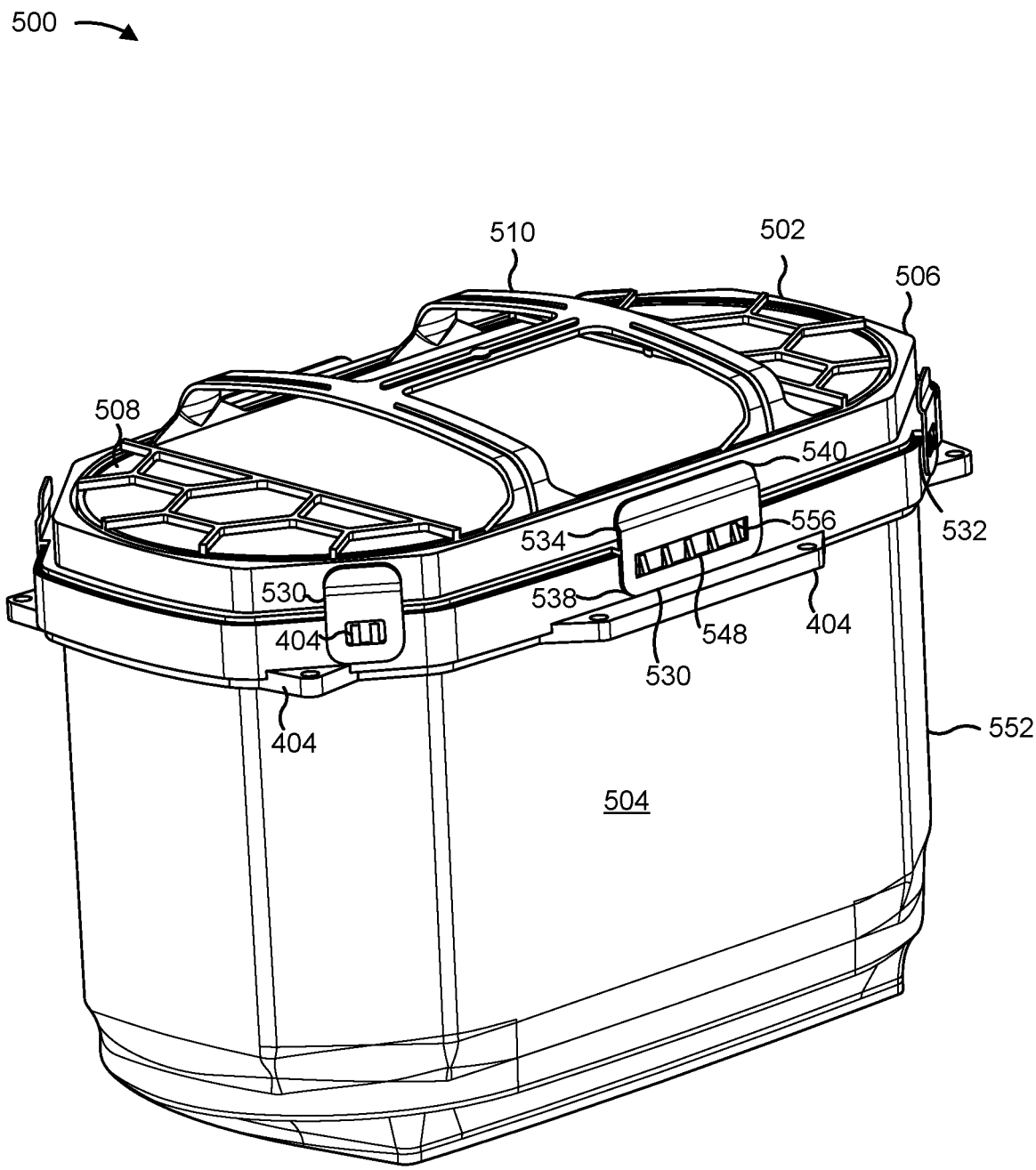

FIGS. 5-6 are diagrams of a filtration device 500, according to one or more aspects of the present disclosure. FIG. 5 is an isometric view of the filtration device 500 in an unlatched state. FIG. 6 is an isometric view of the filtration device 500 in a latched state. It should be understood that the filtration device 500 may correspond to one or more of the plurality of filtration devices 210 of FIGS. 2-4.

As shown in FIGS. 5-6, the filtration device 500 includes a filter element 502 and a housing 504 that is configured to receive the filter element 502. The filter element 502 includes a casing 506, a filter media 508, a grip 510, and a flange 512. The casing 506 includes a first end 514, a second end 516, and an outer surface 518 that defines an outer perimeter of the casing 506 and connects the first end 514 to the second end 516. The first end 514 defines a first opening 520, and the second end 516 defines a second opening 522 that communicates with the first opening 520 to form a hollow interior 524 of the casing 506. The filter media 508, which may be a fluted and/or pleated material such as, for example, paper and/or cotton, is disposed within the hollow interior 524 and is configured to filter the air flowing through the filtration device 500. For example, the filter media 508 may be configured to capture debris particles within the hollow interior 524 of the casing 506 as the air travels from the first opening 520 and through the second opening 522.

The grip 510 is fixedly connected to the first end 514 of the casing 506 and extends across the first opening 520 from a first side edge 526 of the first opening 520 to a second side edge 528 of the first opening 520. The grip 510 is structured and arranged to facilitate handling of the filtration device 500 (e.g., during installation and/or removal of the filtration device 500). For example, the grip 510 may be substantially H-shaped (as shown in FIGS. 5-6), I-shaped, or have another similar shape.

The flange 512 is connected to the outer surface 518 of the casing 506 and extends around the outer perimeter of the casing 506. The flange 512 includes a plurality of snap members 530 that each form part of a latch mechanism that connects the filter element 502 with the housing 504 when the filtration device 500 is in the latched state (as shown in FIG. 4). Each snap member 530 includes a fulcrum 532 and a lever 534 mounted on the fulcrum 532. The fulcrum 532 projects radially from an upper end portion 536 of the flange 512, and the lever 534 extends in a direction that is substantially perpendicular to the fulcrum 532. The lever 534, which is substantially planar and has a substantially rectangular shape, includes a latch portion 538 and a handle portion 540. The latch portion 538 is located at a first end 542 of the lever 534, the handle portion 540 is located at a second end 544 of the lever 534 that is opposite to the first end 542, and the fulcrum 532 is substantially centered therebetween. The latch portion 538 includes a lower inner surface 546 that faces a lower end portion 547 of the flange 512 and a substantially rectangular aperture 548. The handle portion 540 is configured to be depressed in a direction that is substantially parallel to the fulcrum 532 to disengage the latch mechanism. To facilitate depressing the handle portion 540, the handle portion 540 may include a bent section 550.

So as to not interfere with the spacing within the cabinet 106, as described above in connection with FIG. 4, each of the fulcrums 532 of the plurality of snap members 530 may have a length that is less than the radial length of each of the plurality of mounting tabs 404. Thus, the length of each fulcrum 532 may be less than approximately 1.5 inches. For example, the length may be approximately 0.2 inches. Other dimensions are possible.

The housing 504 includes a shell 552, a seal member 554, a plurality of ramp members 556, and the plurality of mounting tabs 404. The shell 552 includes a first end 558, a second end 560, an outer surface 562 that connects the first end 558 to the second end 560, and an inner surface 564 that is opposed to the outer surface 562. The first end 558 defines a first opening 566, and the second end 560 defines a second opening 568 that communicates with the first opening 566 to form a hollow interior 570 of the shell 552. The outer surface 562 defines an outer perimeter of the shell 552, and the inner surface 564 defines an inner perimeter of the shell 552. The inner surface 564 includes a ledge 572 that extends around the inner perimeter of the shell 552 and is positioned a first distance from the first end 558 of the shell 552. The ledge 572 supports the seal member 554, which is an elongated strip of material (e.g., plastic) that is configured to compress the lower end portion 547 of the flange 512 of the filter element 502 when the filtration device 500 is in the latched state.

The plurality of ramp members 556 are fixedly connected to the outer surface 562 of the shell 552 and positioned a second distance from the first end 558 of the shell 552 that is less than the first distance. In other words, the plurality of ramp members 556 are arranged on the shell 552 at a vertical position between the first end 558 of the shell 552 and the ledge 572 of the shell 552. The plurality of ramp members 556 may be arranged in subsets (e.g., of two ramp members, of four ramp members) around the outer perimeter of the shell 552. Each ramp member 556 forms a corresponding part of the latch mechanism and is thus configured to engage one of the plurality of snap members 530. Each ramp member 556 includes an angled surface 574, a first side surface 576, a second side surface 578, and a bottom surface 580. The angled surface 574 extends from the outer surface 562 of the shell 552 at an acute angle relative to the outer surface 562. A vertex of the acute angle is closer to the first end 558 of the shell 552 than to the second end 560 of the shell 552. The angled surface 574, which is substantially rectangular, includes a first edge 582 opposing a second edge 584 and a third edge 586 opposing a fourth edge 588. The first side surface 576 and the second side surface 578, which are substantially triangular, are respectively connected to the first edge 582 of the angled surface 574 and the second edge 584 of the angled surface 574. The bottom surface 580, which is substantially rectangular, is connected to the fourth edge 588 of the angled surface 574.

The plurality of mounting tabs 404, which form part of the mounting mechanism 402 described above in connection with FIG. 4, are fixedly connected to the outer surface 562 of the shell 552. The plurality of mounting tabs 404 are positioned at a distance relative to the first end 558 of the shell 552 that is substantially equal to the first distance.

The casing 506, the grip 510, and/or the plurality of snap members 530 of the filter element 502, to withstand environmental conditions, may be made of a durable material, such as acrylonitrile butadiene styrene (ABS) plastic or another type of plastic. The flange 512, in order to support the plurality of snap members 530 while forming a seal with the housing 504, may be made of multiple materials. For example, the upper end portion 536 of the flange 512, which supports the plurality of snap members 530, may be integral with the plurality of snap members 530 and/or made of a durable material, such as ABS plastic. The lower end portion 547 of the flange 512, in order to be compressible, may be formed of urethane or another type of resilient material. The shell 552 of the housing 504, to likewise withstand environment conditions, may be made of a material such as glass-filled nylon. Other materials are possible.

To connect the filter element 502 to the housing 504, a user may hold the grip 510 and insert the filter element 502 into the hollow interior 570 of the shell 552. As the flange 512 of the filter element 502 enters the hollow interior 570, a bottom surface 590 of the lower end portion 547 of the flange 512 is compressed by the seal member 554, thereby forming the seal. Once the filtration device 500 is installed within the cabinet 106, the seal may prevent air from passing through the cabinet 106 without first passing through the filter media 508. As the lower end portion 547 of the flange 512 of the filter element 502 is increasingly compressed by the seal member 554, the lower inner surfaces 546 of the latch portions 538 slide over the angled surfaces 574 of the plurality of ramp members 556, causing the handle portions 540 of the levers 534 to tilt towards the casing 506 of the filter element 502. Once the apertures 548 of the latch portions 538 contact the bottom surfaces 580 of the plurality of ramp members 556, the plurality of snap members 530 automatically snap onto and engage the plurality of ramp members 556. Thus, the user may place the filtration device 500 into the latched state without directly contacting the latch mechanism.

Conversely, to disconnect the filter element 502 from the housing 504, the user may depress the handle portions 540 of plurality of snap members 530 and pull the grip 510 in a direction away from the housing 504. By depressing the handle portions 540, the user causes the levers 534 to pivot about the fulcrums 532, which disengages the apertures 548 from the plurality of ramp members 556. Due to the resiliency of the plurality of snap members 530, the latch mechanism is capable of being repeatedly latched and unlatched.

As indicated above, FIGS. 5-6 are provided as an example. Other examples may differ from what is described with regard to FIGS. 5-6. For example, the number and arrangement of components (e.g., the plurality of snap members and/or the plurality of ramp members) may differ from that shown in FIGS. 5-6. Thus, there may be additional components, fewer components, different components, differently shaped components, and/or differently arranged components than those shown in FIGS. 5-6.

Figure 7:
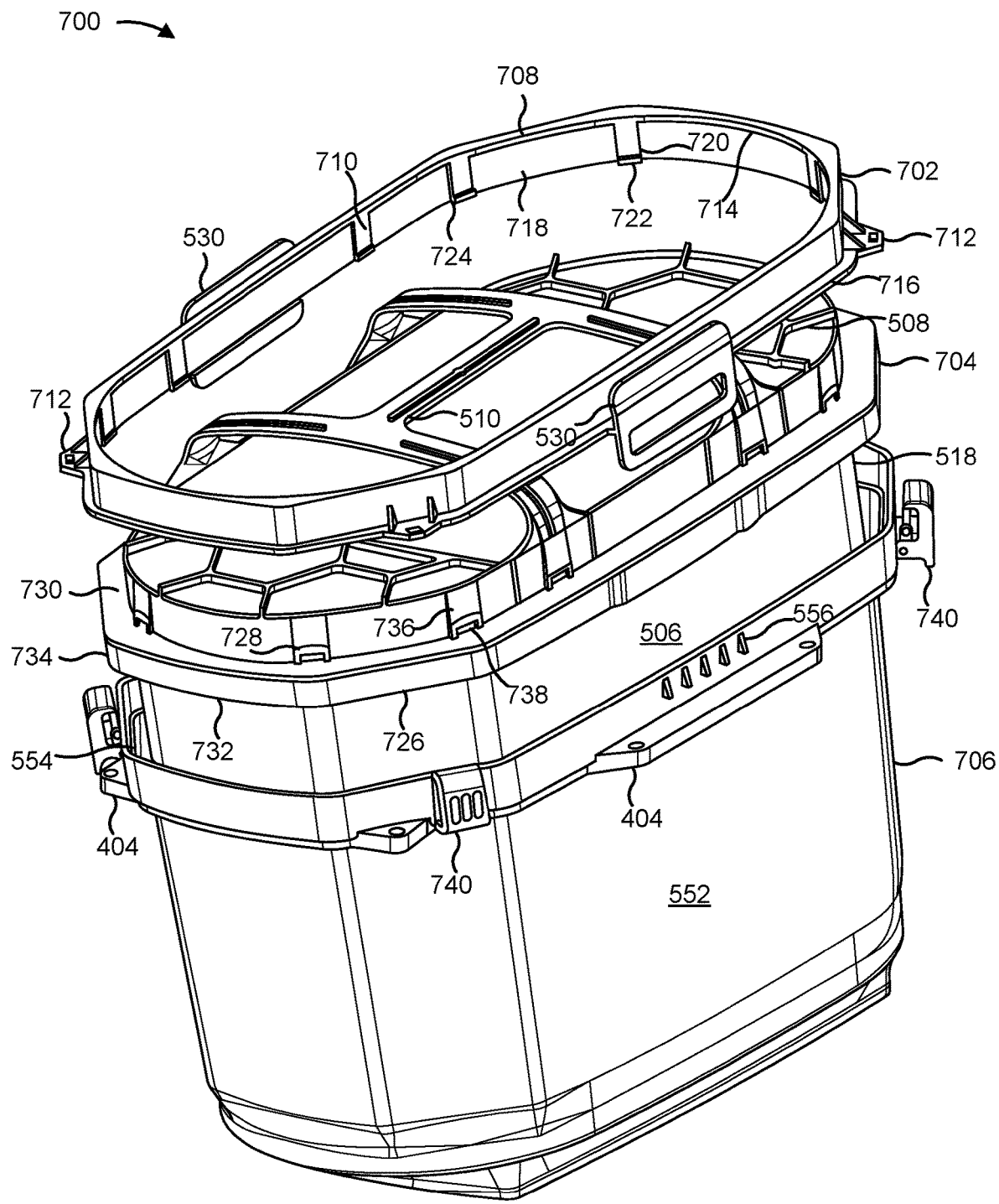
FIGS. 7-8 are diagrams of a filtration device, according to one or more aspects of the present disclosure.
Figure 8:
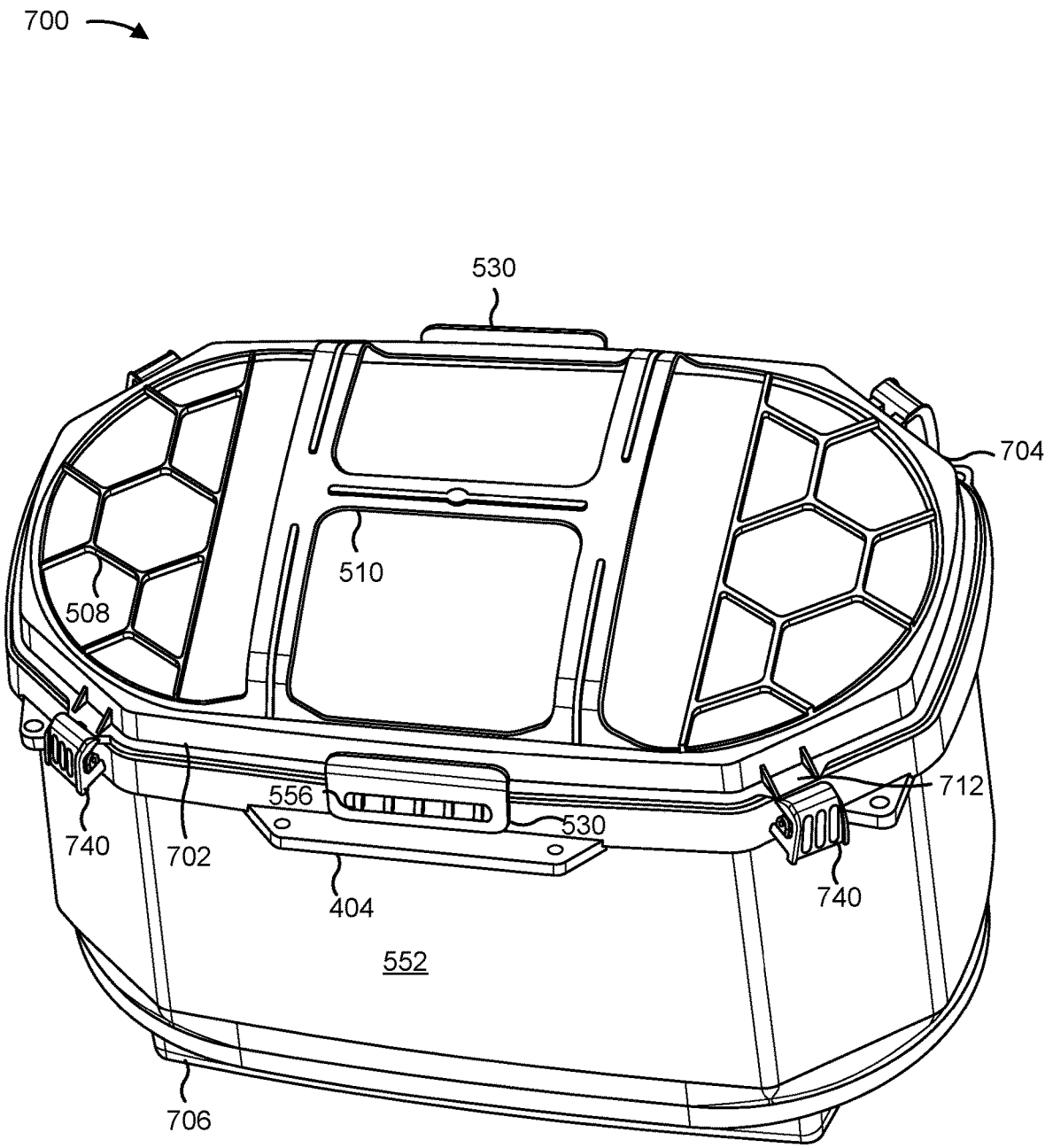

FIGS. 7-8 are diagrams of a filtration device 700, according to one or more aspects of the present disclosure. FIG. 7 is an isometric view of the filtration device 700 in an unlatched state. FIG. 8 is an isometric view of the filtration device 700 in a latched state. It should be understood that the filtration device 700 may correspond to one or more of the plurality of filtration devices 210 of FIGS. 2-4. Furthermore, it should be understood that the filtration device 700 shares features with the filtration device 500. The description below will focus on the differences in structure.

As shown in FIGS. 7-8, the filtration device 700 includes an adapter 702, a filter element 704, and a housing 706. The adapter 702 includes a collar 708, a plurality of locking tabs 710, the plurality of snap members 530, and a plurality of clamping tabs 712. The collar 708 has an upper rim 714, a lower rim 716, and a wall 718 connecting the upper rim 714 to the lower rim 716. The upper rim 714 extends radially inward from the wall 718, and the lower rim 716 extends radially outward from the wall 718. The plurality of locking tabs 710 extend downwardly from the upper rim 714 and are configured to connect the adapter 702 to the filter element 704. Each of the locking tabs 710 includes a body portion 720 and a tooth 722. The body portion 720 extends from the upper rim 714 and is spaced inwardly from the wall 718, and the tooth 722 projects inwardly from a free end 724 of the body portion 720. The plurality of snap members 530, described above in connection with FIGS. 5-6, extend radially outward from the lower rim 716 and are configured to connect the adapter 702 to the housing 706. The plurality of clamping tabs 712, which may assist the plurality of snap members 530 in connecting the adapter 702 to the housing 706, likewise extend radially outward from the lower rim 716.

The adapter 702 may be formed of a single, integral piece of material. For example, to allow the plurality of locking tabs and the plurality of snap members to form resilient connections, the material may be ABS plastic, nylon, or a similar material. Other materials are possible.

The filter element 704, in addition to having the casing 506, the filter media 508, and the grip 510 of the filter element 502, includes a flange 726 and a plurality of receptacles 728. The flange 726 is connected to the outer surface 518 of the casing 506 and extends around the outer perimeter of the casing 506. The flange 726 includes an upper surface 730, a lower surface 732, and an outer surface 734 that connects the upper surface 730 to the lower surface 732. The upper surface 730 of the flange 726 is configured to support the lower rim 716 of the adapter 702 when the adapter 702 is secured to the filter element 704. The lower surface 732 of the flange 726 is configured to form a seal with the housing 706 when the filtration device 700 is in the latched state.

The plurality of receptacles 728 are fixedly connected to the outer surface 518 of the casing 506 and extend between the first end 514 of the casing 506 and the upper surface 730 of the flange 726. In order to engage the plurality of locking tabs 710, the plurality of receptacles 728 are arranged around the outer perimeter of the casing 506. Each receptacle 728 includes an angled surface 736 and an opening 738. The angled surface 736 extends from the outer surface 518 of the casing 506 at an acute angle relative to the outer surface 518. A vertex of the acute angle is closer to the first end 514 of the casing 506 than to the second end 516 of the casing 506. The opening 738 is positioned between the angled surface 736 and the outer surface 518 and is configured to receive a tooth 722 of a respective locking tab 710 when the adapter 702 and the filter element 704 are in an attached state.

The flange 726 of the filter element 704 may be formed of a resilient material such as be urethane. The plurality of receptacles 728 of the filter element 704 may be integral with the casing 506 and thus formed of the same durable material as the casing 506, such as ABS plastic or another type of plastic. Other materials are possible.

The housing 706, in addition to having the shell 552, the seal member 554, the plurality of ramp members 556, and the plurality of mounting tabs 404, includes a plurality of clamps 740. The plurality of clamps 740, which are configured to engage the plurality of clamping tabs 712 on the adapter 702, are pivotably mounted to the outer surface 562 of the shell 552. The plurality of clamps 740, similar to the plurality of mounting tabs 404, are positioned at a distance relative to the first end 558 of the shell 552 that is substantially equal to the first distance. Because the plurality of clamps 740 are arranged at beveled corner portions of the outer surface 562, the plurality of clamps 740 do not interfere with the spacing within the cabinet 106, as described above in connection with FIG. 4.

To attach the adapter 702 to the filter element 704, a user may press the collar 708 onto the flange 726 of the filter element 704. As the adapter 702 is pressed onto the filter element 704, the teeth 722 of the plurality of locking tabs 710 slide over the angled surfaces 736 of the plurality of receptacles 728, causing the body portions 720 to bend toward the wall 718 of the collar 708. Once the free ends 724 of the body portions 720 contact the upper surface 730 of the flange 726, the teeth 722 automatically snap into and engage with the openings 738 of the plurality of receptacles 728. Thus, the user may place the adapter 702 and the filter element 704 into the attached state without directly contacting the plurality of locking tabs 710.

Once the adapter 702 and the filter element 704 are in the attached state, the user may connect the filter element 704 to the housing 706 using substantially the same steps as described above in connection with FIGS. 5-6. Likewise, if so desired, the user may disconnect the filter element 704 from the housing 706 using substantially the same steps as described above. It should be understood, however, that the described order of assembly is provided merely as an example. In practice, the filter element 704 may be inserted into the housing 706 prior to attachment of the adapter 702.

As indicated above, FIGS. 7-8 are provided as an example. Other examples may differ from what is described with regard to FIGS. 7-8. For example, the number and arrangement of components (e.g., the plurality of snap members 530, the plurality of locking tabs 710, the plurality of clamping tab 712, the plurality of ramp members 556, the plurality of receptacles 728, and/or the plurality of clamps 740) may differ from that shown in FIGS. 7-8. Thus, there may be additional components, fewer components, different components, differently shaped components, and/or differently arranged components than those shown in FIGS. 7-8.

While the filtration device 700 has been described as including the plurality of clamps 740 and the plurality of clamping tabs 712, it should be understood that such attachment mechanisms are provided merely as an example. In practice, other types of attachment mechanisms may be used in place of, or in addition to, the plurality of clamps 740 and the plurality of clamping tabs 712. For example, as shown and described in connection with FIGS. 5-6, the filtration device 700 may include only the plurality of snap members 530 and the plurality of ramp members 556. As another example, the filtration device 700 may include, in place of the plurality of clamps 740 and the plurality of clamping tabs 712, one or more different types of attachment mechanisms, such as screws, buckles, C-clamps, or other fasteners.

INDUSTRIAL APPLICABILITY

The filtration device 500, 700 of the present disclosure is particularly applicable within the cabinet 106 of the air cleaner assembly 102. As indicated above, the air cleaner assembly 102 may be configured to communicate with an air intake system associated with an engine. The engine may utilize air in the environment to convert chemical energy stored in fuel into mechanical work. For example, the engine may propel a ground-borne vehicle, such as a mining truck (shown in FIG. 1), a tractor, a backhoe loader, a dozer, an excavator, a grader, or another type of vehicle. As another example, the engine may supply power to a stationary machine, such as a generator, a pump, or another type of machine.

Because the plurality of snap members 530 and the plurality of ramp members 556 have relatively narrow profiles and are configured to engage one another without being directly contacted by a user, the filtration devices 210, 500, 700 of the present disclosure may be arranged more compactly within the cabinet 106. As a result, the air cleaner assembly 102 may more efficiently filter debris particles out of the air. Additionally, with respect to the filtration device 700, the adapter 702 allows the filter element 704 and/or the housing 706 to be used modularly (e.g., within other types and/or sizes of cabinets and/or with other types of attachment devices). Thus, the filtration device 700 may have the added benefit of cost reduction associated with production and/or storage of inventory.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An adapter comprising:
a collar having an upper rim, a lower rim, and a wall connecting the upper rim to the lower rim, wherein
the upper rim extends radially inward from the wall, and
the lower rim extends radially outward from the wall;
a plurality of locking tabs extending downwardly from the upper rim,
wherein the plurality of locking tabs are configured to resiliently engage a plurality of receptacles of a filter element to connect the adapter with the filter element; and
a plurality of snap members extending radially outward from the lower rim,
wherein the plurality of snap members are configured to resiliently engage one or more ramp members of a housing to connect the adapter with the housing.

2. The adapter of claim 1, wherein a locking tab, of the plurality of locking tabs, includes:
a body portion extending from the upper rim and spaced inwardly from the wall; and
a tooth projecting inwardly from a free end of the body portion and configured to slide over an angled surface of a receptacle, of the plurality of receptacles, to engage an opening of the receptacle.

3. The adapter of claim 1, wherein a snap member, of the plurality of snap members, includes:
a fulcrum projecting radially from the lower rim; and
a lever mounted on the fulcrum and extending in a direction that is substantially perpendicular to the fulcrum.

4. The adapter of claim 3, wherein the fulcrum of the snap member has a length less than approximately 1.5 inches.

5. The adapter of claim 3, wherein the lever comprises:
a latch portion at a first end of the lever; and
a handle portion at a second end of the lever, wherein
the first end is opposite to the second end, and
the fulcrum is located between the latch portion and the handle portion of the lever.

6. The adapter of claim 5, wherein the latch portion comprises:
an inner surface that is configured to slide over an angled surface of the one or more ramp members as the filter element is inserted into the housing; and
an aperture that is configured to receive the one or more ramp members of the housing when the filter element and the housing are in a latched state.

7. The adapter of claim 1, further comprising:
a plurality of clamping tabs extending radially outward from the lower rim,
wherein the plurality of clamping tabs are configured to be received by a plurality of clamps of the housing to connect the adapter with the housing.

8. The adapter of claim 1, wherein the adapter is formed from a single, integral piece of material.

9. A filter element comprising:
a casing having a first end, a second end, and an outer surface that connects the first end to the second end, wherein the outer surface defines a perimeter of the casing;
a flange connected to the outer surface and extending around the perimeter of the casing,
wherein the flange has an upper surface; and
a plurality of receptacles that are connected to the outer surface and arranged around the perimeter of the casing, wherein
the plurality of receptacles are configured to receive a plurality of locking tabs of an adapter to permit the filter element to be connected to a housing, and
the plurality of receptacles extend between the first end of the casing and the upper surface of the flange.

10. The filter element of claim 9, wherein
the first end of the casing defines a first opening; and
the second end of the casing defines a second opening that communicates with the first opening to form a hollow interior of the casing.

11. The filter element of claim 10, further comprising:
a filter media that is disposed within the hollow interior of the casing and is configured to filter air flowing from the first opening through the second opening of the casing.

12. The filter element of claim 10, further comprising:
a grip fixedly connected to the casing and extending across the first opening from a first side edge of the first opening to a second side edge of the first opening.

13. The filter element of claim 9, wherein a receptacle, of the plurality of receptacles, includes:
an angled surface that extends from the outer surface of the casing at an acute angle relative to the outer surface, wherein a vertex of the acute angle is closer to the first end of the casing than to the second end of the casing; and
an opening between the angled surface and the upper surface of the flange.

14. The filter element of claim 13, wherein
the angled surface of the receptacle is configured to deflect a locking tab, of the plurality of locking tabs, as the adapter is pressed onto the flange of the filter element; and
the opening of the receptacle is configured to receive a tooth of the locking tab when the filter element and the adapter are in an attached state.

15. A filtration device comprising:
an adapter including:
a collar having an upper rim and a lower rim,
a plurality of locking tabs extending downwardly from the upper rim, and
a plurality of snap members extending radially outward from the lower rim;
a filter element that is configured to receive the adapter, the filter element including:
a casing having a first outer surface that defines a first perimeter of the casing,
a plurality of receptacles that are connected to the first outer surface and arranged around the first perimeter of the casing,
wherein the plurality of receptacles are configured to receive the plurality of locking tabs of the adapter; and
a housing that is configured to receive the filter element, the housing including:
a shell having a second outer surface, and
a plurality of ramp members that are fixedly connected to the second outer surface and are configured to engage the plurality of snap members of the adapter.

16. The filtration device of claim 15, wherein
the second outer surface of the shell connects a first end of the shell to a second end of the shell; and
a ramp member, of the plurality of ramp members, includes:
an angled surface that extends from the second outer surface of the shell at an acute angle relative to the second outer surface,
wherein a vertex of the acute angle is closer to the first end of the shell than to the second end of the shell.

17. The filtration device of claim 15, wherein
the filter element further includes a flange connected to the first outer surface and extending around the first perimeter of the casing;
the shell of the housing further includes an inner surface that is opposed to the second outer surface,
the inner surface including a ledge; and
the housing further comprises:
a seal member that is mounted on the ledge and that is configured to compress the flange of the filter element when the filtration device is in a latched state.

18. The filtration device of claim 15, wherein the filter element further includes a fluted filter media that is disposed within a hollow interior of the casing and is configured to filter air flowing through the filtration device.

19. The filtration device of claim 15, wherein the plurality of snap members, when the adapter is attached to the filter element, are configured to automatically snap onto and engage the plurality of ramp members when the filter element is pressed into the housing.

20. The filtration device of claim 15, wherein
the adapter further includes a plurality of clamping tabs extending radially outward from the lower rim; and
the housing further comprises a plurality of clamps mounted to the second outer surface,
wherein the plurality of clamps are configured to engage the plurality of clamping tabs to connect the adapter and the filter element with the housing.

* * * * *